US009064156B2

(12) United States Patent
 Hattori

(10) Patent No.: US 9,064,156 B2
(45) Date of Patent: Jun. 23, 2015

(54) PATTERN DISCRIMINATING APPARATUS

(75) Inventor: Hiroshi Hattori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 197 days.

(21) Appl. No.: 13/521,527

(22) PCT Filed: Feb. 10, 2010

(86) PCT No.: PCT/JP2010/000848
§ 371 (c)(1),
(2), (4) Date: Jul. 11, 2012

(87) PCT Pub. No.: WO2011/099072
PCT Pub. Date: Aug. 18, 2011

(65) Prior Publication Data
US 2013/0034296 A1 Feb. 7, 2013

(51) Int. Cl.
| *G06K 9/00* | (2006.01) |
| *G06K 9/62* | (2006.01) |
| *G06K 9/48* | (2006.01) |
| *G06K 9/46* | (2006.01) |
| *G06T 7/00* | (2006.01) |

(Continued)

(52) U.S. Cl.
CPC .......... *G06K 9/00805* (2013.01); *G06K 9/4642* (2013.01); *G06K 9/6212* (2013.01); *G06K 2009/3291* (2013.01); *G06T 7/0075* (2013.01); *G06T 7/404* (2013.01); *G06T 2207/10021* (2013.01); *G06T 2207/20076* (2013.01); *G06T 2207/30196* (2013.01); *G06T 2207/30252* (2013.01)

(58) Field of Classification Search
None
See application file for complete search history.

(56) References Cited

U.S. PATENT DOCUMENTS

| 2005/0151734 A1* | 7/2005 | Gubkin et al. ................ 345/424 |
| 2005/0286756 A1* | 12/2005 | Hong et al. .................... 382/154 |
| 2009/0052739 A1 | 2/2009 | Takahashi et al. |

FOREIGN PATENT DOCUMENTS

JP     2000-207566     7/2000

OTHER PUBLICATIONS

Fernández et al, "Pedestrian Recognition for Intelligent Transportation Systems," 2005, ICINCO 2005—Robotics and Automation, pp. 292-297.*

(Continued)

*Primary Examiner* — Bhavesh Mehta
*Assistant Examiner* — David F Dunphy
(74) *Attorney, Agent, or Firm* — Amin, Turocy & Watson, LLP

(57) ABSTRACT

A pattern discriminating apparatus includes a setting unit configured to set at least one area in a three-dimensional space in a three-dimensional image data, a feature value calculating unit configured to calculate a pixel feature value from one pixel to another of the three-dimensional image data, a matrix calculating unit configured to (1) obtain at least one point on a three-dimensional coordinate in the area which is displaced in position from a focused point on the three-dimensional coordinate in the area by a specific mapping, and (2) calculate a co-occurrence matrix which expresses the frequency of occurrence of a combination of the pixel feature value of the focused point in the area and the pixel feature values of the mapped respective points, and a discriminating unit configured to discriminate whether or not an object to be detected is imaged in the area on the basis of the combination of the specific mapping and the co-occurrence matrix and a learning sample of the object to be detected which is learned in advance.

5 Claims, 7 Drawing Sheets

(51) Int. Cl.
*G06T 7/40* (2006.01)
*G06K 9/32* (2006.01)

(56) References Cited

OTHER PUBLICATIONS

Jain et al, Machine Vision, 1995, McGraw-Hill, Inc., pp. 234-248.*
International Search Report for International Application No. PCT/JP2010/000848 mailed on Mar. 9, 2010.
Watanabe, Tomoki, et al.; "Co-occurence Histograms of Oriented Gradients for Pedestrian Detection", PSIVT, 2009, LNCS 5414, pp. 37-47.
Dalal, Navneet, et al.; "Histograms of Oriented Gradients for Human Detection", IEEE, 2005.
Rautkorpi, Rami, et al.; "A Novel Shape Feature for Image Classification and Retrieval", ICIAR, 1004.

* cited by examiner

FIG. 3A  FIG. 3B
(a) 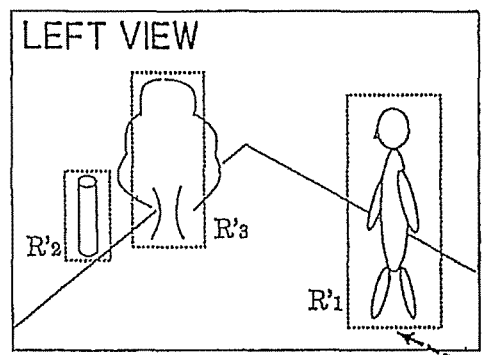
(b) 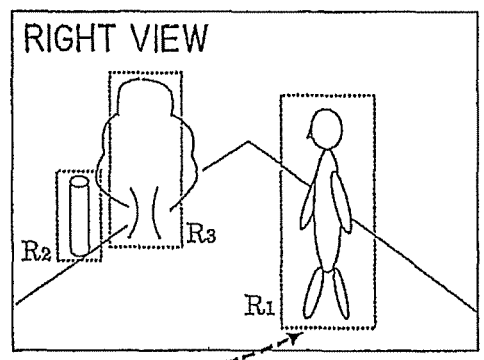
FIG. 4
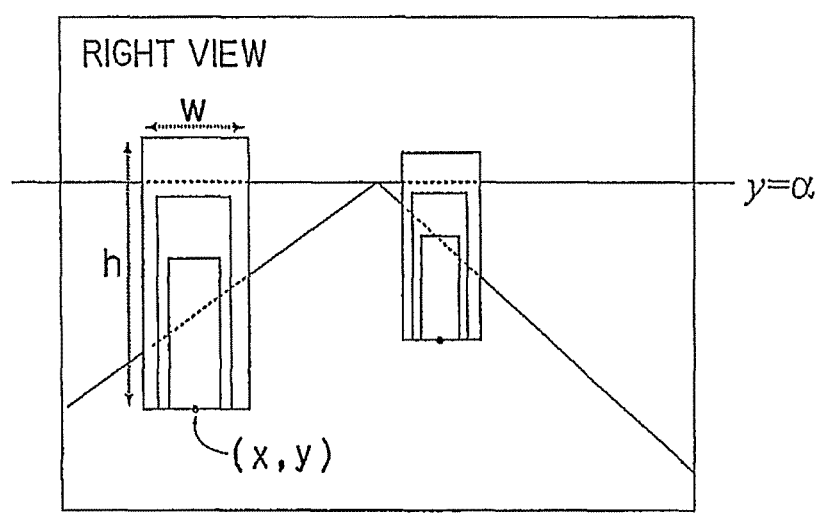

(a)

LEFT IMAGE (b)

RIGHT IMAGE (a)

(b)

PATTERN DISCRIMINATING APPARATUS

TECHNICAL FIELD

The present invention relates to a pattern discriminating technology for discriminating a substance included in an image.

BACKGROUND ART

In Non-patent Document 1, a method of extracting a feature value in a pattern recognition (pattern discrimination) for discriminating a human and others from an image is disclosed. More specifically, the image is divided into plural areas in a reticular pattern and a histogram in the direction of a brightness gradient calculated for each of the areas is employed as a feature value.

In Patent Document 1 and Non-Patent Document 2, methods of extracting a feature value for classifying the types of the texture images are described. A technology described in Patent Document 1 employs a simultaneous occurrence matrix having elements P(i, j), which are the numbers of combinations in which a concentration of a point shifted in parallel from a point having a concentration i in certain distance and direction is j in an image as the feature value. In the texture image, since similar patterns appear repeatedly equidistantly, the feature value representing the simultaneous occurrence of concentration values at two points apart from each other at an equal distance is effective for discrimination of the texture. A technology in Non-Patent document 2 extracts a robust feature value with respect to an illumination variation by using the simultaneous occurrence matrix in the direction of the brightness gradient instead of the concentration value of the image.

RELATED ART REFERENCES

Patent Documents

Patent Document 1: JP-A-2000-207566
Non-Patent Document 1: Navneet Dalal, and Bill Triggs, "Histograms of oriented gradients for human detection, "CVPR 2005, vol. 1, pp. 886-893, 2005.
Non-Patent Document 2: Rami Rautkorpi and Jukka Iivarinen, "A Novel Shape Feature for Image Classification and Retrieval," Proceedings of the International Conference on Image Analysis and Recognition, LNCS 3211, Part I, pages 753-760, Porto, Portugal, Sep. 29-Oct. 1, 2004.
Non-Patent Document 3: T. Watanabe, S. Ito, K. Yokoi "Co-occurrence Histograms of Oriented Gradients for Pedestrian Detection Third Pacific Rim Symposium", PSIVT 2009 pp. 37-47

OUTLINE OF INVENTION

Problems to be Solved by the Invention

In the technology in Non-Patent Document 1, since the brightness gradient distribution is calculated for each of the areas segmentalized into a reticular pattern, the structure information of the texture in the area is not reflected in the feature value. For example, even when the patterns are upside down in the same area in the reticular pattern, the completely same feature value is calculated from this area, and hence there is a problem that the loss of information effective for discrimination is resulted.

Since the feature values calculated in the technologies described in Patent Document 1 and Non-Patent Document 2 are based on the brightness at two points different in spatial position or the brightness gradient, information relating to the structure is also reflected to some extent. However, since the feature values are based on a two-dimensional image, there is a problem in that the feature value does not describe the three-dimensional shape of the substance.

In order to solve such problems as described above, it is an object of the present invention to provide a pattern discriminating apparatus having a higher discriminating performance with respect to three-dimensional image data.

Means for Solving the Problems

A pattern discriminating apparatus according to an embodiment of the present invention includes: a setting unit configured to set at least one area in a three-dimensional space in a three-dimensional image data; a feature value calculating unit configured to calculate a pixel feature value from one pixel to another of the three-dimensional image data; a matrix calculating unit configured to (1) obtain at least one point on a three-dimensional coordinate in the area which changes in position from a focused point on the three-dimensional coordinate in the area by a specific mapping, and (2) calculate a co-occurrence matrix which expresses the frequency of occurrence of a combination of the pixel feature value of the focused point in the area and the pixel feature values of the mapped respective points, and a discriminating unit configured to discriminate whether or not an object to be detected is imaged in the area on the basis of the combination of the specific mapping and the co-occurrence matrix and a learning sample of the object to be detected which is learned in advance.

Advantage of the Invention

According to the present invention, a high discriminating performance with respect to the three-dimensional image data is achieved.

BRIEF DESCRIPTION OF THE DRAWINGS

FIGS. 3(a) and 3(b) are drawings for explaining an example of a stereo image.

FIG. 4 is a first drawing for explaining a candidate rectangle generating method.

BEST MODE FOR CARRYING OUT THE INVENTION

Figure 1:
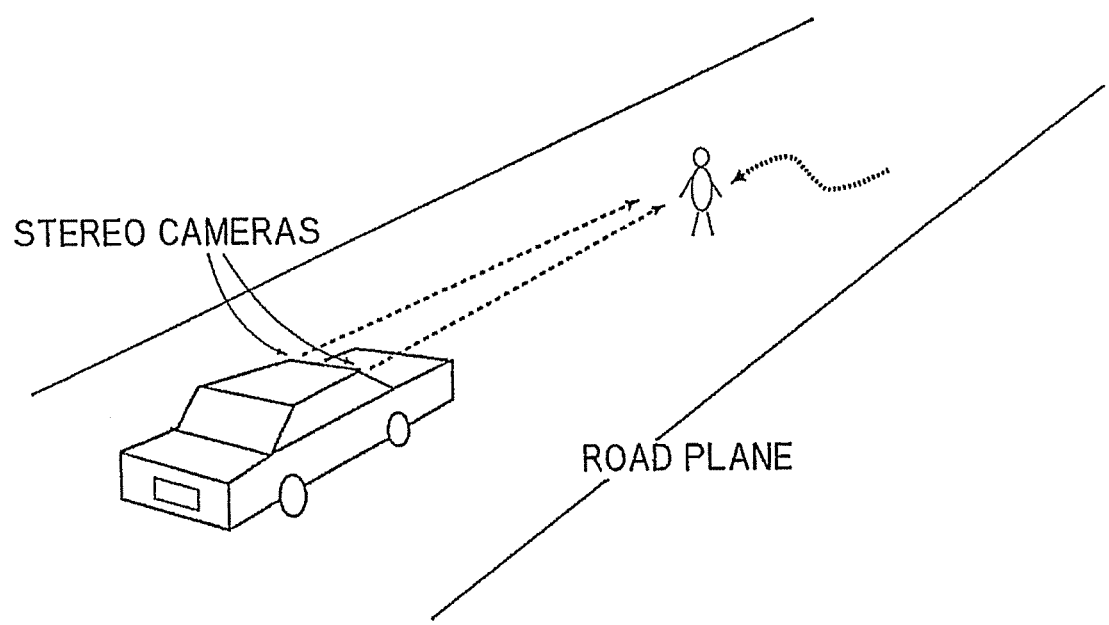
FIG. 1 is an explanatory drawing of an example in which a pattern discriminating apparatus is applied showing an embodiment of the present invention.

Referring now to the drawings, a pattern discriminating apparatus 10 according to an embodiment of the present invention will be described.

In this embodiment, it is assumed that two cameras are mounted in front of an automotive vehicle and a pedestrian existing in the direction of travel of the vehicle is detected as shown in FIG. 1.

Figure 2:
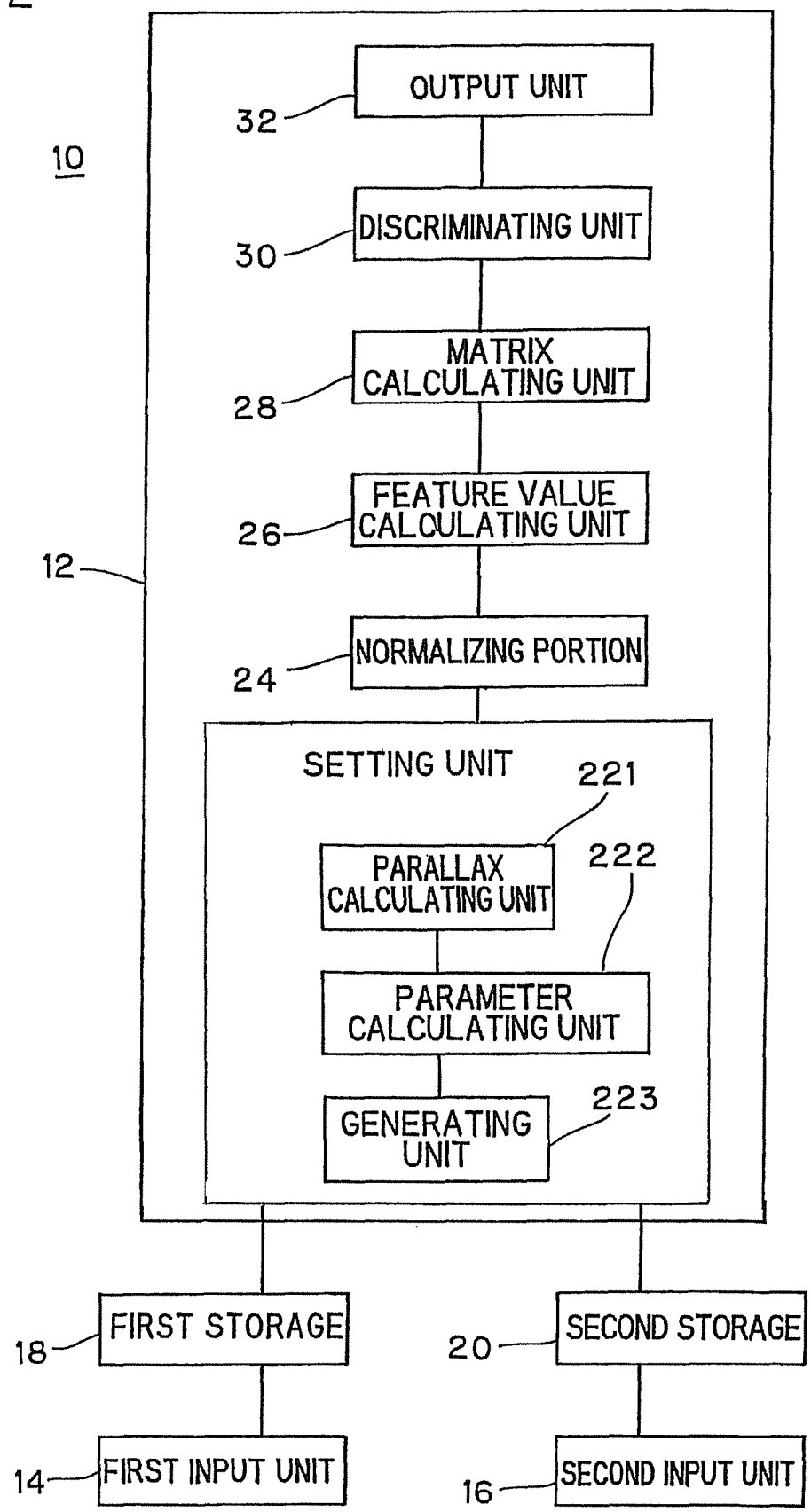
FIG. 2 is a configuration drawing of the pattern discriminating apparatus.

Referring now to FIG. 2, a configuration of the pattern discriminating apparatus 10 will be described. FIG. 2 shows a block diagram of the pattern discriminating apparatus 10. The pattern discriminating apparatus 10 includes a first input unit 14, a second input unit 16, a first storage 18, a second storage 20, and a feature extracting apparatus 12. The feature extracting apparatus 12 includes a setting unit 22, a normalizing portion 24, a feature value calculating unit 26, a matrix calculating unit 28, a discriminating unit 30, and an output unit 32.

The first input unit 14 and the second input unit 16 input a stereo image shot from different points of view using the two cameras. The relative positions and the directions of the plural cameras are arbitrary as long as the imaging points of view are overlapped with each other. However, in this embodiment, the stereo image is assumed to be shot with the same two cameras arranged on the left and right sides in parallel to each other.

Figure 5:
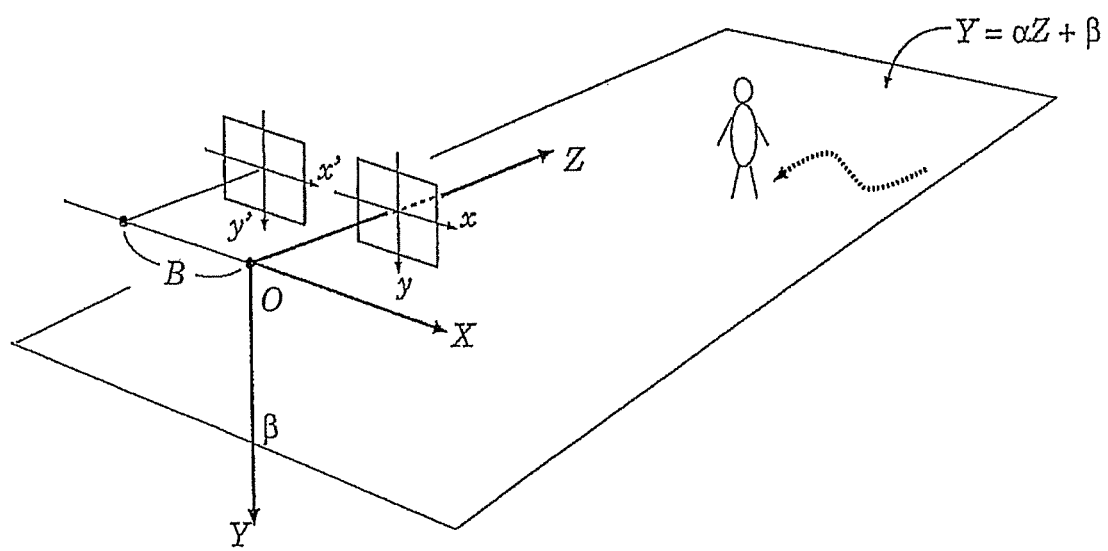
FIG. 5 is a drawing for explaining a coordinate system.

FIG. 5 shows a coordinate system used in this embodiment. The coordinate system includes a stereo camera coordinate system and an image coordinate system.

The stereo camera coordinate system is a three-dimensional coordinate, and its original point O is set at a point of view (lens center) of a right camera, a straight line connecting points of view of the left and right cameras is set as an X-axis, a direction perpendicularly downward is set as a Y-axis, and a direction of an optical axis of the camera is set as a Z-axis. A distance between the cameras (base length) is assumed as B. The position of the left camera can be expressed as (−B, 0, 0). For the simplicity, when a road plane is modeled by a flat plane and the inclination in the horizontal direction is ignored as being minute, the plane of the road is expressed as $Y=\alpha Z+\beta$ in the stereo camera coordinate system. The character $\alpha$ indicates the inclination of the road plane viewed from a stereo camera, and the character $\beta$ indicates the height from the road surface of the stereo camera. In the following description, $\alpha$ and $\beta$ are collectively referred to as a road plane parameter. In general, the inclination of the road differs from place to place, and the cameras vibrate when the vehicle is traveling. Therefore, a road surface parameter changes every second in association with the movement of the vehicle.

The image coordinate system is a two-dimensional coordinate and is configured to set for each image. The image coordinate system sets a x-axis in the horizontal direction of the right image, and a y-axis in the vertical direction thereof and, in the same manner, an x'-axis in the horizontal direction of the left image, and a y'-axis in the vertical direction, and the x-axes and the x'-axes in the horizontal direction of the left and right images match the X-axis direction. In such a case, since y=y' is satisfied where points on the left image corresponding to points (x, y) on the right image are (x', y'), only the difference in position in the horizontal direction has to be considered. In the following description, the difference in the horizontal direction is referred to as "stereo parallax", and is expressed as a parallax d=x'−x with the right image as a reference image. The stereo parallax is referred to simply as "parallax" in the following description.

The first storage 18 and the second storage 20 store data of the two stereo images acquired by the first input unit 14 and the second input unit 16.

The setting unit 22 includes a parallax calculating unit 221, a parameter calculating unit 222, and a generating unit 223 as shown in FIG. 2, and extracts three-dimensional substances existing on the road as candidate areas. As shown in dotted rectangles in FIG. 3, as the candidate area, the three-dimensional substances are extracted on one of the images or both of the left and right images. Detailed description will be given below.

The parallax calculating unit 221 calculates the parallax d between the stereo images stored in the first storage 18 and the second storage 20.

Figure 6A:
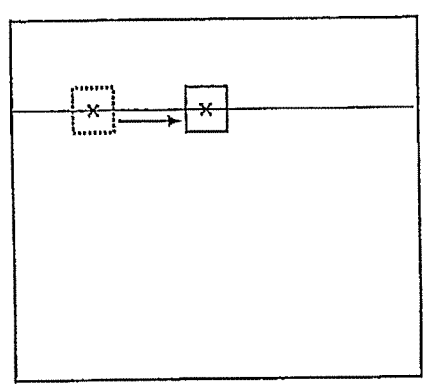
FIGS. 6(a) and 6(b) are drawings for explaining a parallax calculation.
Figure 6B:
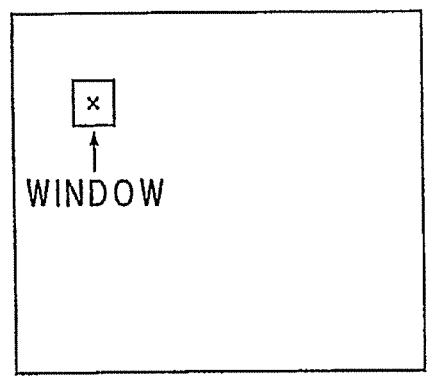

As shown in FIG. 6, the parallax calculating unit 221 searches and obtains a point $x'=(x', y)^T=(x+d, y)$ corresponding to an arbitrary point $x=(x, y)$ on the right image as a reference image on the same scanning line on the left image. The parallax d in this case is not a negative value, that is, d≥0 is established. Therefore, the parallax calculating unit 221 has to search only the right side of the same coordinate at the time of searching. More specifically, as shown in FIG. 6, the parallax calculating unit 221 sets a window around the point x on the right image, and obtains a point having a brightness pattern which is most similar to a brightness pattern in the set window in a window of the same size from the same scanning line on the left image. For example, a normalized mutual correlation C is used as a criterion of the evaluation of the similarity of the brightness pattern. If the parallax calculating unit 221 sets the size of the search window to (2w+1)×(2w+1) pixels and the brightness in the windows set on the left and right images is expressed respectively by $f(\xi, \eta)$, $g(\xi, \eta)$, the normalized mutual correlation C is given by an expression (1) shown below.

[Expression 1]

$$C = \frac{1}{N} \times \frac{1}{\sigma_1 \sigma_2} \sum_{\eta=-w}^{w} \sum_{\xi=-w}^{w} (f(\xi, \eta) - \bar{f}) \times (g(\xi, \eta) - \bar{g}) \qquad (1)$$

$N=(2w+1)^2$ represents the number of pixels in the windows, $\bar{f}$, $\bar{g}$ represent averages of brightness in the windows, $\sigma_1^2$, $\sigma_2^2$ represent dispersion of the brightness in the respective windows, and these values are given by an expression (2) and an expression (3) given below. For reference, characters f, g with a bar symbol on top are expressed as "f¯", "g¯" in the description.

[Expression 2]

$$\bar{f} = \frac{1}{N} \sum_{\eta=-w}^{w} \sum_{\xi=-w}^{w} f(\xi, \eta), \bar{g} = \frac{1}{N} \sum_{\eta=-w}^{w} \sum_{\xi=-w}^{w} g(\xi, \eta) \qquad (2)$$

$$\sigma_1^2 = \frac{1}{N} \sum_{\eta=-w}^{w} \sum_{\xi=-w}^{w} \{f(\xi, \eta) - \bar{f}\}^2, \qquad (3)$$

$$\sigma_2^2 = \frac{1}{N} \sum_{\eta=-w}^{w} \sum_{\xi=-w}^{w} \{g(\xi, \eta) - \bar{g}\}^2$$

When a point corresponding to an arbitrary point on the reference image is searched using the normalized mutual correlation C, the parallax calculating unit 221 obtains the parallax d for all the points, that is, a parallax map.

The parameter calculating unit 222 calculates a road plane parameter p=(α, β) using the parallax map calculated by the parallax calculating unit 221.

First of all, a method of obtaining a three-dimensional position (X, Y, Z) of a point (x, y) on the reference image from the parallax d of that point by the parameter calculating unit 222 will be described. An expression (4) shown below is established between a point (X, Y, Z) in the three-dimensional space and projection images (x', y), (x, y) thereof on the left and right images.

[Expression 3]

$$\begin{cases} x = X/Z \\ y = Y/Z \\ d = x' - x = B/Z \end{cases} \quad (4)$$

When solving the expression (4) for X, Y, X,

[Expression 4]

$$X = \frac{B}{d}x, Y = \frac{B}{d}y, Z = \frac{B}{d} \quad (5)$$

is obtained. The parameter calculating unit 222 obtains the three-dimensional position on the reference image from which the parallax d is obtained using the expression (5) shown above. The parameter calculating unit 222 obtains a road plane parameter p=(α, β) by selecting a point at a short distance to the road plane from the measured values, and substituting the selected values to an equation of the road plane Y=αZ+β. The point at a short distance to the road plane is extracted as a point which satisfies the condition of an expression (6) shown below.

[Expression 5]

$$|Y_p - Y| \leq \Delta Y \quad (6)$$

Here, ΔY is a threshold value and an adequate value is set in advance. Symbol $Y_p$ represents a Y-coordinate of an intersection point between a straight line passing through the point (X, Y, Z) and parallel to the Y-axis and the reference road plane. The road plane parameter p of the reference road plane is measured on a flat road when the vehicle is stopped, for example. If the road plane parameters of the reference road plane are assumed to be α^, β^, $Y_p$ is obtained by an expression (7) shown below. The characters α, β, with a hat symbol ^ on top are expressed as "α^", "β^" in the description.

[Expression 6]

$$Y_p = \hat{\alpha}Z + \hat{\beta} \quad (7)$$

The generating unit 223 generates an area in which the pedestrian is included according to the following procedure.

The generating unit 223 sets a rectangle having an arbitrary point (x, y) on the parallax map at a midpoint of a lower side thereof as shown in FIG. 4. The lower side of the rectangle is substantially in contact with the road plane and the size of the rectangle is determined in consideration of vertical and lateral dimensions of a human, which is an object to be detected. For example, when the representative values of the height and the lateral width of the human are expressed respectively by H,
W, a height h and a width w can be obtained in the following manner. From the equation of the road plane Y=αZ+β and the expression (4),

[Expression 7]

$$1/Z = (y - \alpha)/\beta \quad (8)$$

is obtained, so that the height h and the width w can be calculated from an expression (9) shown below.

[Expression 8]

$$w = \frac{W}{Z} = \frac{W}{\beta}(y - \alpha), h = \frac{H}{Z} = \frac{H}{\beta}(y - \alpha) \quad (9)$$

In this manner, the size of the rectangle on the image varies depending on the position on the image in the vertical direction, that is, the y-coordinate. Also, in order to accommodate various sizes of the human, the generating unit 223 prepares plural types of the rectangles for the respective points (x, y) on the image as shown in FIG. 4. In FIG. 4, three types of rectangles are exemplified.

Figure 7A:
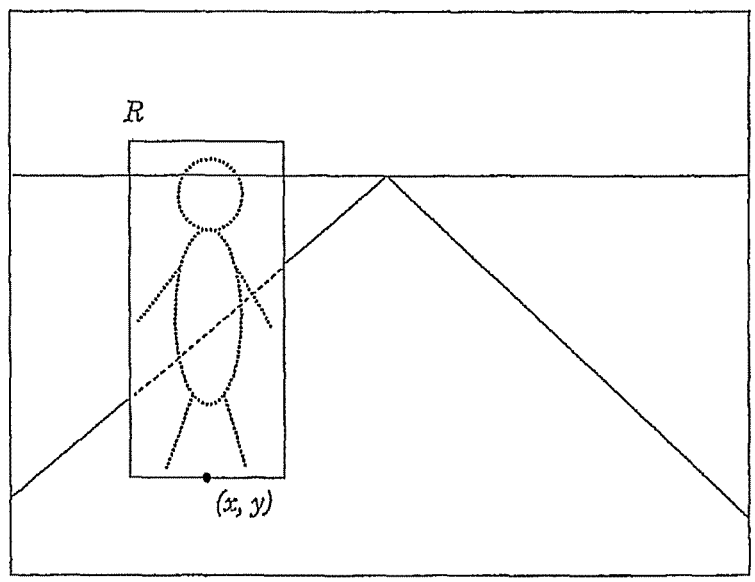
FIGS. 7(a) and 7(b) are second drawings for explaining the candidate rectangle generating method.
Figure 7B:
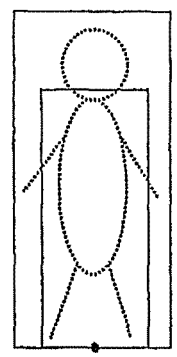

Subsequently, the generating unit 223 evaluates the probability that a human (pedestrian) is included in a rectangle R as shown in FIG. 7(*a*) from the parallax d in the rectangle set for each point (x, y) in this manner. When the human is included in the rectangle R, the distance from the camera in the rectangle R, that is, the depth becomes substantially uniform, and hence the parallax also becomes uniform. The parallax $d_p$ is given by an expression (10) since the point (x, y) is in contact with the road plane.

[Expression 9]

$$d_p = \frac{B}{\beta}(y - \alpha) \quad (10)$$

Therefore, if $d_i$ is a parallax of an arbitrary point in the rectangle R, the uniformity of the parallax can be evaluated by the number of points N which satisfies

[Expression 10]

$$|d_i - d_p| \leq \Delta d \quad (11)$$

In order to take an influence into consideration by the size of the rectangle R, normalization is performed by the surface area S=w×h of the rectangle R and the generating unit 223 registers the rectangle R which satisfies an expression (12) shown below as a candidate area.

[Expression 11]

$$\hat{N} = N/S \geq N_{min} \quad (12)$$

The value of $N_{min}$, is a threshold value and an adequate value is set in advance. As shown in FIG. 7(*b*), the parallax in the rectangle R becomes uniform even when the rectangle R is smaller than the object, so that the value of N^ becomes a large value, and the conditions described above may be satisfied. Therefore, when the rectangles having plural sizes satisfy the condition described above for a certain point, only the largest rectangle R may be selected as the candidate area R.

Subsequently, by the process described above, the generating unit 223 generates N (N≥0) candidate areas $R_1$ to $R_N$. FIG. 3 shows three candidate areas $R_2$, $R_3$. In addition, the corresponding areas $R'_1$ to $R'_N$ on the left image may be extracted. The lower sides of the respective rectangles R are in contact with the road plane, and the parallax thereof is given by the expression (10), so that the corresponding areas $R'_1$ to $R'_N$ can be generated from a y-coordinate of the lower sides of the respective rectangles R.

The setting unit 22 having the parallax calculating unit 221, the parameter calculating unit 222, and the generating unit 223 may set corresponding areas between the stereo images as shown by dotted rectangles in FIG. 3, or may set one of the areas. In the following description, the setting unit 22 is assumed to extract N areas $R_1$ to $R_N$ on the right image as the reference image.

The normalizing portion 24 normalizes the N areas $R_1$ to $R_N$ set by the setting unit 22 to a predetermined size. Although the size of the normalization is arbitrary, the rectangles are set equally to vertically elongated rectangles of 48×24 pixels in this embodiment.

The feature value calculating unit 26 calculates the pixel feature value of the image data in the area normalized by the normalizing portion 24 from pixel to pixel.

As the pixel feature value, for example, a direction of brightness gradient is used. The direction of brightness gradient is a robust pixel feature value with respect to illumination variation or the like, and is the pixel feature value effective even under the environment in which a change in brightness is significant. When the change in brightness is relatively small, the value of the brightness itself may be used as the pixel feature value or the number of tones of the brightness may be reduced. In the following description, a case where the direction of the brightness gradient is used as the pixel feature value will be described.

Figure 9:
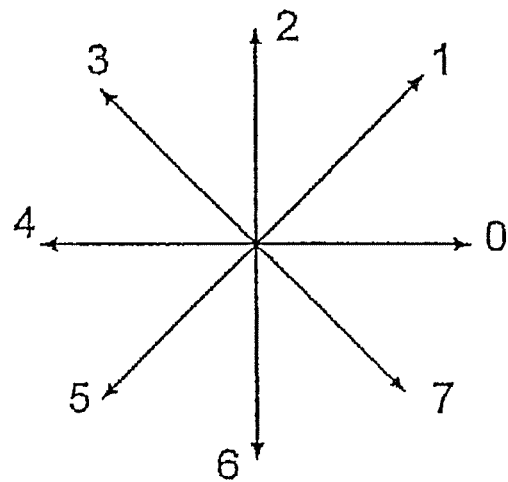
FIG. 9 is a drawing for explaining the direction of brightness gradient.

The feature value calculating unit 26 quantizes the calculated direction of the brightness gradient to a discrete value within an adequate range or, for example, eight directions as shown in FIG. 9. In FIG. 9, numbers 1 to 8 are assigned so as to correspond to the respective directions.

The matrix calculating unit 28 extracts and outputs the co-occurrence feature from one normalized area to another. In the case of this embodiment, the co-occurrence feature is a feature vector λ.

Figure 8:
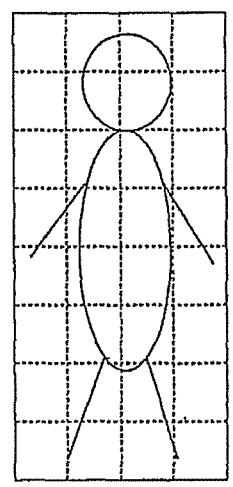
FIG. 8 is a drawing for explaining a mesh defined for areas.

The matrix calculating unit 28 segmentalizes the respective areas normalized by the normalizing unit 24 into meshes as shown in FIG. 8 and calculates the co-occurrence histogram from one mesh to another. Although the number of meshes are arbitrary, as shown in FIG. 8 for example, the area is divided into 8×4 matrix in the vertical and lateral direction. Since the entire area has 48×24 pixels, one segment of the mesh includes 6×6 pixels. The co-occurrence histogram will be described below.

Figure 10:
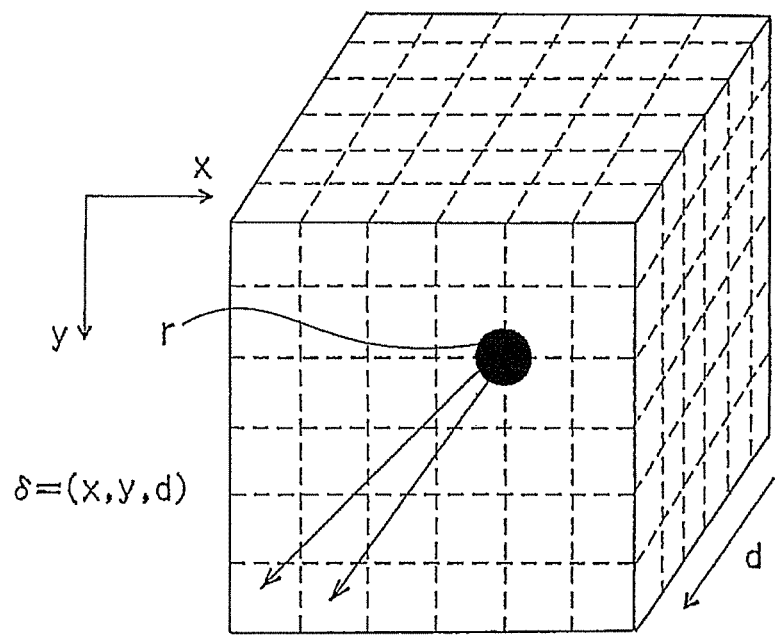
FIG. 10 is a drawing for explaining a displacement vector.

FIG. 10 shows one segment of the meshes in FIG. 8 in an enlarged scale. A first axis is defined as a lateral x, a second axis is defined as a vertical y, and a third axis is defined as the parallax d. The respective blocks (that is, the respective pixels) are expressed by a three-dimensional coordinate (x, y, d) which is a combination of the image position (x, y) and the parallax d.

Since the parallax d is calculated one by one per pixel, data of a certain pixel (x, y) includes only one parallax d. However, a label indicating "undefined" is stored for the undefined three-dimensional position.

Figure 11A:
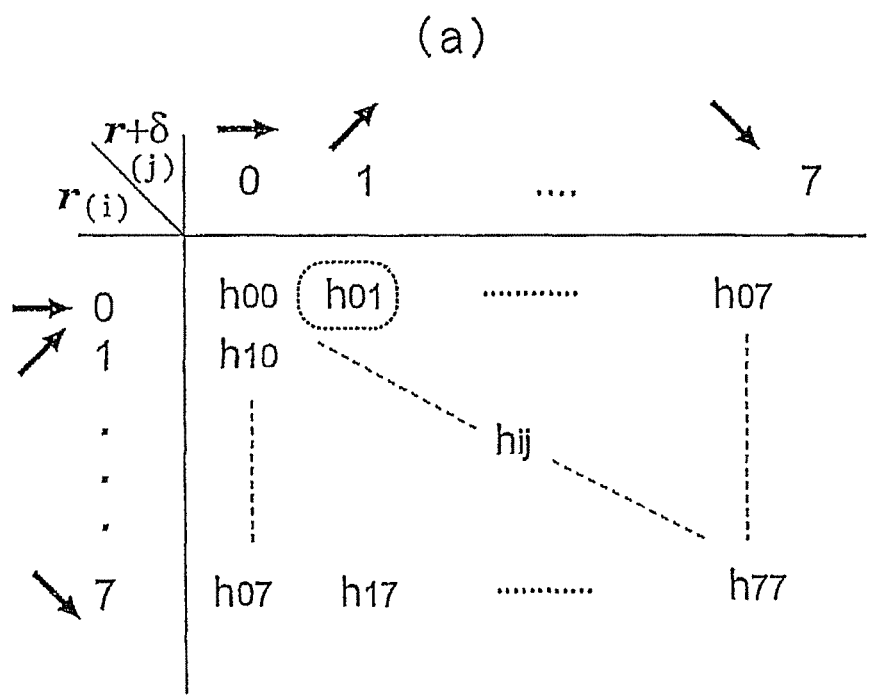
FIGS. 11(a) and 11(b) are drawings for explaining a co-occurrence histogram in an image in the direction of the brightness gradient.

A certain focused point (a certain focused pixel) r=(x, y, d) (the center point in FIG. 10) and a point at a position apart from the focused point by displacement vector $\delta=(\delta_x, \delta_y, \delta_d)$, that is, plural mapping points r+δ obtained by mapping a target point r with the displacement vector δ are considered. For example, the matrix calculating unit 28 stores D types (20 types, for example) of displacement vectors S in advance, and obtains 20 types of the mapping points r+δ. Arrows in a solid line in FIG. 10 indicate a case of the displacement vector δ=(−2, 2, 2). The co-occurrence matrix as shown in FIG. 11(a) is defined with the pixel feature value of the focused point r and the pixel feature value of the mapping point r+δ expressed as i, j respectively. The arrows and the numerical values of the vertical axis and the lateral axis in FIG. 11(a) correspond to the arrows and the numerical values in FIG. 9. When the combination of the pixel feature value i of the focused point r and the pixel feature value j of the mapping point r+δ is (i, j)=(0, 1), an element $h_{01}$ of the co-occurrence matrix corresponds thereto. In general, a co-occurrence matrix $h_{ij}$ is defined as an expression (13) shown below.

[Expression 12]

$$h_{ij} \# \{x | I(x)=i, I(x+\delta)=j\} \quad (13)$$

Here, a symbol # indicates the number of elements (frequency of occurrence) of an aggregation represented by elements shown in curly brackets. Also, I(x) indicates the pixel feature value at a point x on the image. In other words, the co-occurrence matrix $h_{ij}$ of the expression (13) is a two-dimensional histogram showing the distribution in one segment of the meshes relating to the combination of the pixel feature values i, j at two points (focused point and mapping point) defined by the displacement vector δ. For reference, in order to obtain the distribution in the one segment of the meshes, all the points (pixels) on the three-dimensional coordinate in the one segment of the mesh are set in sequence as the focused points r to obtain the co-occurrence matrix $h_{ij}$. Since the co-occurrence matrix $h_{ij}$ is defined for one displacement vector δ, if the D types of the displacement vector 6 are used, D two-dimensional histograms are generated. This two-dimensional histogram is the co-occurrence histogram.

Figure 11B:
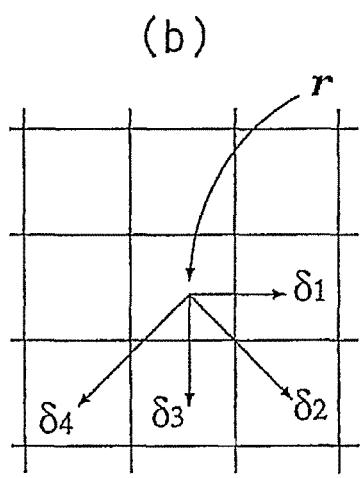

FIG. 11(b) shows a two-dimensional displacement vector δ at a Chebyshev distance of 1 apart from the focused point r. These two-dimensional vectors are defined for the respective depths. Here, for example, since δ=(0, 1) can be substituted by δ=(1, 0) when the focused point and the mapping point are interchanged, there exist four types $\delta_1$ to $\delta_4$ of the two-dimensional displacement vectors δ having a Chebyshev distance of 1.

When the depth (parallax d) is broken into five stages before and after the focused point as shown in FIG. 10, the types of the displacement vectors δ are D=4×5=20 types. Since the direction of the brightness gradient is broken into eight stages, an 8×8×20=1280-dimensional feature vector is calculated for one segment of the meshes shown in FIG. 8.

In this example, since the total number of meshes is 8×4=32, a 1280×32=40960-dimensional feature vector λ is generated from the one area. The N feature vectors λ obtained by performing the same process for the N areas are output to the discriminating unit 30.

The discriminating unit 30 performs the discriminating process using the N feature vectors λ calculated by the matrix calculating unit 28.

More specifically, a linear function g (λ) is defined as an expression (14) for the feature vector λ and the discriminating unit 30 determines whether or not the substance is the object to be detected (the pedestrian in this embodiment) depending on the magnitude of the output of the function g(λ). For example, when the value of the function g (λ) is larger than the threshold value, the discriminating unit 30 discriminates that the substance is a pedestrian.

$$g(\lambda)=w^T\lambda+b \quad (14),$$

where "w" is a vector having the same number of dimensions as λ and "b" is a constant term. "$^T$" represents the transference of the vector. "w" and "b" are learned in advance using a learning sample of the object to be detected (a pedestrian in this embodiment). As a learning method, for example, a support vector machine may be used.

The output unit 32 outputs the result of the discriminating process performed by the discriminating unit 30 that is, the result of whether or not the substance is a pedestrian.

According to this embodiment, a pattern discrimination with high degree of accuracy can be realized by calculating the pixel feature value reflecting the three-dimensional shape of the substance.

In this embodiment, a case where the pedestrian existing in the direction of travel is detected using the camera installed in front of the vehicle has been described. However, the cameras may be installed on the sides or the rear of the vehicle, or the invention may be applied to a case where the cameras are mounted on other moving bodies other than the vehicle, for example, the robot. The substance on which the cameras are installed is not limited to the moving bodies, and a monitoring camera may be applied.

In this embodiment, the case of detecting a human is described. However, the object to be detected is not limited thereto, and other objects to be detected are also applicable. Also, a case of detecting plural classes of substances such as detecting a human and a vehicle simultaneously is also applicable.

In this embodiment, the stereo view in the case in which the two cameras are arranged on the left and right in parallel is described. However, the number of cameras is arbitrary as long as there are at least two cameras, and the layout of the plural cameras is not limited as long as there are overlapped parts in views.

In this embodiment, a case in which the direction of the brightness gradient is quantized into eight stages as the pixel feature value to be calculated by the feature value calculating unit 26 is described. However, the brightness gradient may be quantized into four directions of upward and downward (2 and 6) and leftward and rightward (0 and 4) viewed as one, or the magnitude may be employed instead of the direction of the brightness gradient. Alternatively, output values of filters such as Gaussian filter, Sobel filter, and Laplacian filter may be used. In addition, plural types of the pixel feature value may be calculated for the respective pixels by combining some of these filters.

In this embodiment, a system of performing a depth restoring process using the stereo cameras as the input portions 16, 18 is described. However, it is also possible to use a shooting apparatus which can input a three-dimensional image directly. As the apparatus described above, there is, for example, three-dimensional voxel data of C.T. devices or M.R.I devices used in a medical field.

In this embodiment, the case where the matrix calculating unit 28 calculates the co-occurrence of the features in the two pixels is described. Generally, however, the co-occurrence characteristic in the N-pixels (N is arbitrary integer numbers of three or more) may be calculated. While the co-occurrence histogram generated by the co-occurrence of the pixel feature value in the two pixels is two-dimensional, the N-dimensional co-occurrence histogram is required for expressing the co-occurrence of the pixel feature value at the N-pixels.

Also, in this embodiment, the case where the matrix calculating unit 28 calculates the co-occurrence of the same type of feature (direction of brightness gradient) is described. However, the co-occurrence of the different image feature values such as the direction of the brightness gradient and the brightness may be calculated. By using the plural image feature values, the accuracy of discrimination may be improved.

Also, in this embodiment, the plural methods of obtaining the mapping point by the parallel movement with the displacement vector of $\delta=(\delta_x, \delta_y, \delta_d)$ in the matrix calculating unit 28 are described. However, the invention is not limited thereto, and a rotational movement vector or other vectors which perform the mapping may be used as the displacement vector.

The present invention is not limited to the embodiments shown above as is, and components may be modified and embodied without departing from the scope of the invention in the stage of implementation. Also, various modes of the invention are achieved by combining the plural components disclosed in the embodiments described above as needed. For example, several components may be eliminated from all the components shown in the embodiment. In addition, the components in different embodiments may be combined as needed.

DESCRIPTION OF REFERENCE NUMERALS AND SIGNS

10 . . . pattern discriminating apparatus, 12 . . . feature extracting apparatus, 14 . . . first input unit, 16 . . . second input unit, 18 . . . first storage, 20 . . . second storage, 22 . . . setting unit, 24 . . . normalizing portion, 26 . . . feature value calculating unit, 28 . . . matrix calculating unit, 30 . . . discriminating unit, 32 . . . output unit

The invention claimed is:

1. A pattern discriminating apparatus comprising:
a setting unit configured to set at least one three-dimensional area in a three-dimensional space in a three-dimensional image data;
a feature value calculating unit configured to calculate a pixel feature value from one pixel to another of the three-dimensional image data;
a matrix calculating unit configured to (1) calculate plural mapping points on a three-dimensional coordinate in the area which are displaced in position in respective three-dimensional directions from a focused point on the three-dimensional coordinate in the area by a mapping with plural three-dimensional displacement vectors, and (2) calculate a co-occurrence matrix which expresses the frequency of occurrence of a combination of the pixel feature value of the focused point in the area and the pixel feature values of the mapping points in the respective three-dimensional directions for each of the displacement vectors; and
a discriminating unit configured to calculate a value for discrimination from a vector which is learned and a constant term which is learned from a learning sample of an object to be detected, and the co-occurrence matrix for each of the three-dimensional displacement vectors, compare the value for discrimination and a threshold value with each other, and thereby discriminate whether or not the object to be detected is imaged in the three-dimensional area.

2. The pattern discriminating apparatus according to claim 1, further comprising:
an input unit configured to input a plurality of two-dimensional image data viewed from different points of view; and
a parallax calculating unit configured to calculate parallax between the two-dimensional image data, wherein the setting unit sets the area to the three-dimensional space of the three-dimensional image data having a point where the parallax expressed by a two-dimensional coordinate on a single image from among the two-dimensional image data is obtained and the parallax at a point at which the parallax is obtained, and the feature value calculating unit calculates the pixel feature value of the three-dimensional image data from one pixel to another.

3. The pattern discriminating apparatus according to claim 2, wherein the setting unit sets the area in the three-dimensional space in which the number of points at which the parallax having a difference from a specific value smaller than the reference is obtained is larger than a threshold value.

4. The pattern discriminating apparatus according to claim 3, wherein the pixel feature value is a direction of brightness gradient, a magnitude of brightness gradient, or a brightness.

5. The pattern discriminating apparatus according to claim 1, wherein the three-dimensional image data is three-dimensional voxel data.

* * * * *